Figure 1:
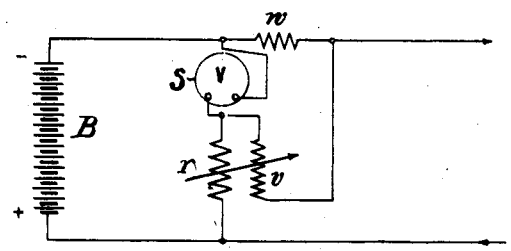

June 6, 1939.    E. WITTE    2,161,495
METHOD OF AND SYSTEM FOR MEASURING THE STATE OF CHARGE
OR DISCHARGE OF SECONDARY BATTERIES
Filed Oct. 30, 1936

Inventor:
Erich Witte
by Frank Reichow
Attorney.

Patented June 6, 1939

2,161,495

UNITED STATES PATENT OFFICE 2,161,495

METHOD OF AND SYSTEM FOR MEASURING THE STATE OF CHARGE OR DISCHARGE OF SECONDARY BATTERIES

Erich Witte, Hagen, Germany, assignor to Accumulatoren-Fabrik Aktiengesellschaft, Berlin, Germany, a joint stock company of Germany Application October 30, 1936, Serial No. 108,477
In Germany October 31, 1935

2 Claims. (Cl. 175—183)

My invention relates to improvements in the method of and system for measuring the state of charge or discharge of secondary batteries, and more particularly in the method and system in which the said state of charge or discharge is determined by measuring the terminal voltage of the battery by a circuit arrangement including a voltmeter and a circuit for compensating for the variations in the terminal voltage, caused by the apparent internal resistance of the battery, from the theoretical E. M. F. of the battery when the current value is zero, the said circuit being connected to the system in such a way that besides the normal voltage measuring current also a part of the charging or discharging current flows through the voltmeter coil, so that the voltmeter indicates a voltage value, which on the discharge of the battery is higher than the actual voltage applied by the battery to the terminals of the voltmeter, and is higher by as much as the voltage drop caused by the apparent internal resistance in the battery. Systems of this type are shown and described in British Patent 438,407. As has been described in this patent, a variable control resistance through which a part of the charging or discharging current passes, is connected with the measuring instrument, and the said resistance is adjusted in dependence on the apparent internal resistance and the size of the battery. However, by varying the current through the resistance the value of the resistance of the measuring instrument and therewith its constant is varied.

The object of the improvements is to obviate this disadvantage, and with this object in view the current through a control resistance in parallel and/or that through a resistance in series with the measuring instrument is so adjusted that the current through the measuring instrument remains constant while the apparent internal resistance of the battery varies. Thus the measuring instrument gives the same deflection so long as the capacity of the battery remains at about the same value. As the apparent internal resistance of the battery increases, the current in the control resistance which is in parallel with the measuring instrument must be increased, and that in the resistance which is in series with the instrument must be reduced by the same amount. By this adjustment the current in the measuring instrument remains constant, whereas if the adjustment were not made the current through the measuring instrument would fall and even if the capacity remained the same, different readings would be obtained.

Figure 2:
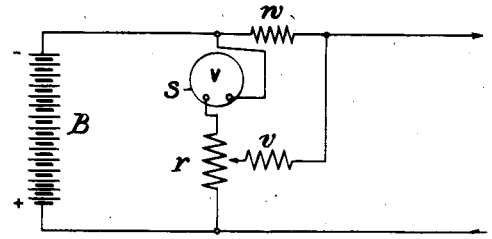
Figure 3:
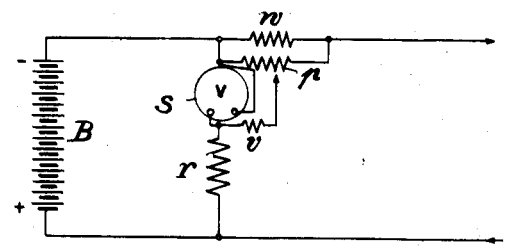

For the purpose of explaining the invention several examples embodying the same have been shown in the accompanying drawing in which the same reference characters have been used in all the views to indicate corresponding parts. In said drawing, Fig. 1 is a diagram showing the circuit of my improved system, and Figs. 2 and 3 are similar diagrams showing modifications.

Referring to Fig. 1 a variable resistance $r$ is connected in series with the coil of a measuring instrument $s$ for showing the state of charge or discharge of a battery B. A control resistance $v$, which is also variable, is shunted from a diverting resistance $w$ and connected in parallel with the coil of the said measuring instrument $s$. The resistances $v$, $r$ are preferably adjusted simultaneously. For this purpose the adjusting means of $v$ and $r$ are mechanically coupled together, as is indicated by an arrow extending across both resistances, so that for each value of $v$ there is a corresponding definite value of $r$. Thus, by properly regulating the current flow through the resistances $v$ and $r$, the current in the coil of the said measuring instrument $s$ and the deflection of the instrument are kept constant as the apparent internal resistance of the battery B varies.

The control resistance $v$ may, in certain cases, be kept constant (although the effective value of the resistance is adjusted). This is shown in Fig. 2. One end of the constant resistance $v$ is connected to the choke diverting resistance $w$, while the other end is connected as in a potentiometer to a variable point in the resistance $r$, adjusted according to the compensation required. This is sufficient to fulfill the requirements set forth above.

In order to obtain practical equality of the voltage constant to the desired degree of accuracy, with varying degrees of compensation a further resistance $p$ (Fig. 3) is connected across the diverting resistance $w$. The voltage necessary for compensation is taken off the resistance $p$ at the variable point of connection thereto of one end of the selected fixed resistance $v$. By suitably choosing the potentiometer resistance $p$ practical equality of the voltage constant of the circuit is attained to any desired extent while the degree of compensation is varied.

I claim:

1. The herein described system for measuring the state of charge and discharge of an electric storage battery, that includes, in combination with the battery and its charging and discharging circuit, a measuring circuit connected to the terminals of the battery and including, arranged in series, a voltmeter and a resistance, and a circuit adapted to make compensation in the measuring circuit for variations in the apparent internal resistance of the battery, which compensating circuit includes a diverting resistance arranged in series with the charging and discharging circuit and a resistance that together with the voltmeter is arranged in shunt with said diverting resistance; the improvement herein described which consists in an auxiliary resistance within the compensating circuit bridging the leads to and from the diverting resistance, and a movable contact that brings a larger or smaller portion of said auxiliary resistance into circuit with the resistance associated with the diverting resistance in said compensating circuit.

2. In the method of ascertaining the state of charge and discharge of a battery that consists in measuring, with a meter in a measuring circuit connected across the terminals of the battery, the terminal voltage of the battery compensated by a value depending on a current diverted from the charging and discharging circuit of the battery and flowing in a compensating circuit connected in shunt with the meter in said measuring circuit; the refinement herein described which consists in establishing, by correlatively adjusting the effective values of resistances in said circuits, such electrical balance of the compensating and measuring circuits that the current in said compensating circuit is automatically varied in accordance with variation in the apparent internal resistance of the battery while the current in said measuring circuit is automatically varied in accordance with the changes in terminal voltage, with compensation for the change in the value of such measuring current caused by, or accompanying, variation in value of the current flowing in said compensating circuit, whereby, for a given state of charge and discharge of the battery, the indication of said meter will be the same irrespective of the apparent internal resistance of the battery and the value of the current in said charging and discharging circuit.

ERICH WITTE.